April 14, 1959     R. E. V. RAMSING     2,882,005
SWIVEL CANOPY FOR LIGHTING FIXTURES
Filed April 12, 1956

INVENTOR.
ROBERT E.V. RAMSING
BY
Lyon & Lyon
ATTORNEYS

United States Patent Office 2,882,005
Patented Apr. 14, 1959

2,882,005

SWIVEL CANOPY FOR LIGHTING FIXTURES

Robert E. V. Ramsing, Los Angeles, Calif., assignor, by mesne assignments, to Ekco Products Company, Chicago, Ill., a corporation of Illinois Application April 12, 1956, Serial No. 577,825

2 Claims. (Cl. 248—343)

This invention relates to swivel canopies for lighting fixtures, and included in the objects of this invention are:

First, to provide a swivel canopy which may be employed to suspend dual suspended as well as single conduit suspended lighting fixtures of the fluorescent or incandescent type.

Second, to provide a swivel canopy which includes a novelly arranged suspension bracket adapted for attachment to an electrical junction box, and a swivel member carried by a suspension conduit, the suspension bracket and swivel being so arranged that they may be readily assembled after the bracket has been secured in place and after the lighting fixture has been joined to the suspension conduit; in fact, conductors may be threaded through the members prior to assembly.

Third, to provide a swivel canopy which is particularly suitable for hanging fixtures from sloping ceilings, wherein the suspension conduit is at other than ninety degrees relative to the ceiling.

Fourth, to provide a swivel canopy for lighting fixtures which greatly simplifies the installation of ceiling suspended lighting fixtures.

With the above and other objects in view, as may appear hereinafter, reference is directed to the accompanying drawings in which.

Figure 1:
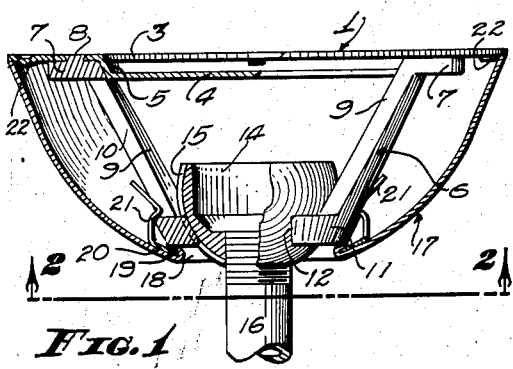
Figure 1 is a partial side, partial sectional view of the swivel canopy taken through 1—1 of Fig. 2.

The swivel canopy for lighting fixtures includes a cover plate 1, preferably circular and dimensioned to cover the under or open side of a conventional electrical junction box, not shown. For the purpose of attaching junction boxes of different sizes and configurations, the cover plate 1 is provided with sets of keyhole slots 2.

The cover plate 1 is provided with a central aperture 3 which is bridged by a diametrically extending web 4. The web is preferably offset downwardly from the plane of the cover plate and forms shoulders 5 at its extremities.

Secured to the underside of the cover plate 1 is a suspension bracket 6. The suspension bracket includes foot portions 7 having integral riveted elements 8 which are received in apertures radially outward from the shoulders 5 of the web 4. The radially inner ends of the foot portions 7 abut the shoulders 5.

Extending downwardly from the foot portions 7 are converging legs 9 which are preferably provided with longitudinal slots 10. The lower ends of the legs 9 are joined to a suspension ring 11 having a side slot 12 therein. The bore of the suspension ring 11 defines the zone of a sphere and is provided with a keyboss 13. The suspension bracket 6, comprising the foot portions 7, legs 9, and suspension ring 11, is preferably a diecasting to simplify its manufacture.

The suspension ring 11 receives a swivel ball 14 which is preferably hollow, and has a spherical outer face of somewhat greater extent than a hemisphere. The swivel ball 14 is provided with a keyway 15 which mates with the keyboss 13. One end of the swivel ball 14 is internally screw-threaded for connection to a suspension conduit 16.

Figure 3:
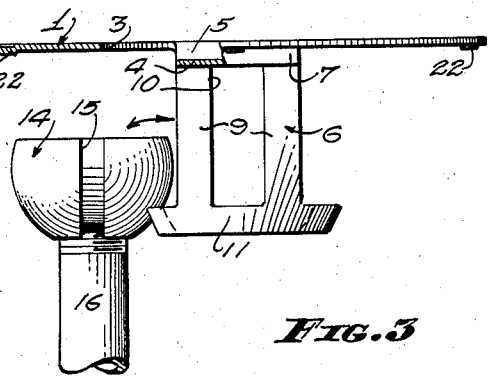
Fig. 3 is a partial sectional, partial side view of the mounting bracket and cover plate, and also showing the manner in which the swivel ball is assembled therein.
Figure 2:
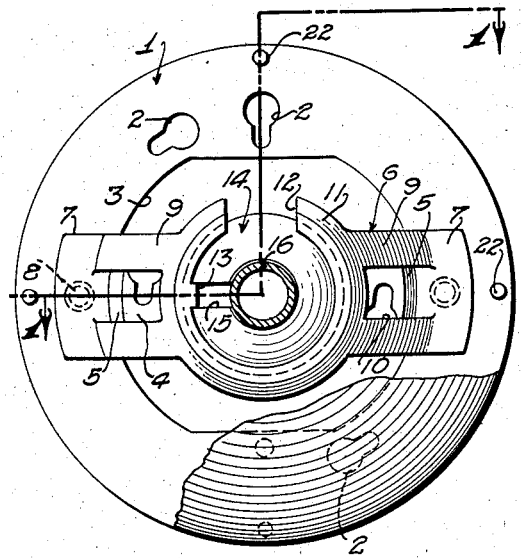
Fig. 2 is a sectional view thereof, taken through 2—2 of Fig. 1 with a portion of the canopy shell broken away.
Figure 4:
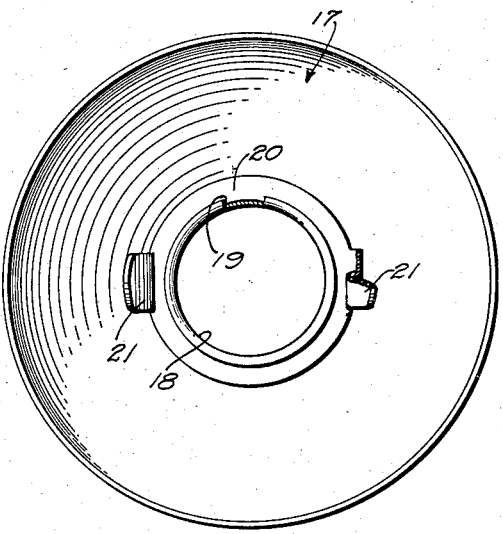
Fig. 4 is a top view of the canopy shell with one of the spring clips broken away.

The suspension conduit 16 is adapted to be connected to any lighting fixture or other device which it is desired to suspend from the swivel ball 14 and suspension bracket 6. The side slot 12 is dimensioned to pass the suspension conduit 16 so that as the suspension bracket 6 is installed in place the swivel ball 14 and suspension conduit 16 may be slipped into or out of the suspension ring 11 through the side slot 12, as best indicated in Fig. 3.

A canopy shell 17, which may be substantially hemispherical in form, or have any other desired cup-shaped configuration, encloses the suspension bracket. The canopy shell 17 is provided with an aperture 18 of sufficient diameter to pass the swivel ball 14. The margins of the aperture 18 are folded, as indicated by 19, and the folded margin is employed to clamp a spring clip ring 20 within the canopy shell 17.

Extending from the spring clip ring 20 are diametrically disposed spring clips 21 which are adapted to snap over the outer margins of the suspension ring 11, preferably within the longitudinal slots 10 provided in the legs 9.

The upper or major diametered portion of the canopy shell 17 preferably extends to the margins of the cover plate 1, and is centered relative thereto by lugs 22 formed in the cover plate 1 adjacent its margins.

The swivel canopy may be installed as follows:

The cover plate 1, with the suspension bracket 6 previously secured thereto, is mounted under the open side of a junction box, or the like, by use of the keyhole slots 2. Any wires needed for connection to a lighting fixture are brought downward through the aperture 3 on either side of, or on one side of, the bridge web 4. Such wires may be threaded through the swivel ball 14 and suspension conduit 16 before insertion of the swivel ball in the suspension ring 11. Previous to insertion of the electrical wires, the canopy shell 17 is slipped over the swivel ball 14, or the canopy shell is assembled from the far end of the suspension conduit 16.

The swivel ball 14 is assembled in the suspension ring 11 by lifting the swivel ball high enough to clear the suspension ring and then moving the swivel ball and its conduit laterally so that the conduit enters through the side slot 12. It will be noted that the legs 9 are sufficiently spaced as to permit passage of the swivel ball 14.

After locating the swivel ball 14 within the suspension ring 11, it is turned until the keyway 15 registers with the keyboss 13. When so engaged, the swivel ball 14 may pivot about axes transverse to the suspension conduit 16 but cannot rotate about the axis of the conduit 16, so that the conductors or electric wires extending therethrough will not become twisted.

It is not necessary, however, that the electrical conductors be attached to the wiring within the outlet box before installation of the suspension conduit 16. That is, the lead wires or conductors from the fixture may extend through the conduit and protrude from the swivel ball 14 and the mating leads may protrude from the junction box, so that they may be joined after the fixture is mechanically supported from the suspension bracket 6, that is, after assembly of the swivel ball 14 in the suspension ring 11.

In fact, the swivel canopy lends itself to various installation procedures capable of being formed by a single workman, so that even large, clumsy, and heavy fixtures may be readily installed. Furthermore, by reason of the swivel connection afforded by the ball 14 and ring 11, fixtures may be readily suspended from ceilings or other surfaces which are inclined.

While a particular embodiment of this invention has been shown and described, it is not intended to limit the same to the exact details of the construction set forth, and it embraces such changes, modifications, and equivalents of the parts and their formation and arrangement as come within the purview of the appended claims.

I claim:

1. A swivel canopy for lighting fixtures including a bracket having an upper mounting portion, a lower suspension ring, and legs spaced apart circumferentially of said ring joining the latter to said mounting portion, a mounting plate to which said mounting portion is fastened, said mounting plate having downwardly offset positioning means formed integrally therewith, with which inwardly facing surfaces of the mounting portion of said bracket are engageable to locate said bracket in a preselected position along the surface of the mounting plate facing said bracket, a swivel member supported at the inner periphery of the suspension ring facing said mounting plate, said swivel member having a conduit attached thereto for suspension below said suspension ring, said ring having its continuity broken by a side entrance through which said conduit has passage to and from a position within the area of the inner periphery of said ring, a boss on said ring and a slot in the side of the swivel member with which said boss cooperates to prevent rotation of said swivel member relative to said ring about an axis coincident with the axis of said conduit, and a canopy shell having an upper rim portion joined to the periphery of the mounting plate and enclosing the bracket except for an opening at the lower end of said shell through which said conduit extends.

2. In a swivel canopy for lighting fixtures according to claim 1, wherein said canopy shell is removably connected to the bracket by means including spring clips mounted on the inner side of the canopy shell and downwardly engageable with surfaces of the suspension ring between said legs.

References Cited in the file of this patent

UNITED STATES PATENTS

| | | |
|---|---|---|
| 945,074 | Bagley | Jan. 4, 1910 |
| 981,039 | Volk | Jan. 10, 1911 |
| 1,330,585 | Grigsby et al. | Feb. 10, 1920 |
| 1,529,822 | Adam | Mar. 17, 1925 |
| 2,285,883 | Anderson | June 9, 1942 |
| 2,299,870 | Arras | Oct. 27, 1942 |
| 2,753,445 | Thomas et al. | July 3, 1956 |